US012092299B2

(12) United States Patent
Dorman et al.

(10) Patent No.: US 12,092,299 B2
(45) Date of Patent: *Sep. 17, 2024

(54) FLOOD LIGHT

(71) Applicant: MILWAUKEE ELECTRIC TOOL CORPORATION, Brookfield, WI (US)

(72) Inventors: Justin D. Dorman, Madison, WI (US); Jonathan M. Mantes, Franklin, WI (US); David Proeber, Milwaukee, WI (US); Jason D. Thurner, Menomonee Falls, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/244,629

(22) Filed: Sep. 11, 2023

(65) Prior Publication Data

US 2023/0417399 A1 Dec. 28, 2023

Related U.S. Application Data

(63) Continuation of application No. 17/902,345, filed on Sep. 2, 2022, now Pat. No. 11,754,265, which is a (Continued)

(51) Int. Cl.

*F21V 21/088* (2006.01)
*F21L 4/00* (2006.01)

(Continued)

(52) U.S. Cl.

CPC ............ *F21V 21/0885* (2013.01); *F21L 4/00* (2013.01); *F21S 6/004* (2013.01); *F21S 8/003* (2013.01);

(Continued)

(58) Field of Classification Search

CPC ...... F21L 4/04; F21L 4/00; F21S 6/004; F21S 8/003; F21V 21/26; F21V 21/28; F21V 21/30; F21V 21/088; F21V 21/0885

See application file for complete search history.

(56) References Cited

U.S. PATENT DOCUMENTS 3,226,536 A 12/1965 Atkin et al.
5,887,969 A 3/1999 Gordin (Continued)

FOREIGN PATENT DOCUMENTS

DE 10053196 1/2002
DE 202013007270 11/2014

(Continued)

OTHER PUBLICATIONS

European Search Report for Application No. 16203513.3 dated Jun. 2, 2017 (9 pages).

(Continued)

*Primary Examiner* — William N Harris
(74) *Attorney, Agent, or Firm* — Michael Best & Friedrich LLP

(57) ABSTRACT

A light includes a housing having a top face, a bottom face, a first side face, a second side face, and a surface arranged adjacent to the bottom face. The top face, the bottom face, the first side face, the second side face, and the surface are each configured to support the light. The light further includes a head pivotally coupled to the housing. The head includes a lens and a plurality of LEDs configured to emit light through the lens. The light additionally includes a power source configured to provide power to the plurality of LEDs. The head is positioned between the top face, the bottom face, and the first and second side faces in a first position of the head. The surface is obliquely oriented relative to the lens when the head is in the first position.

20 Claims, 9 Drawing Sheets

Related U.S. Application Data continuation of application No. 17/223,769, filed on Apr. 6, 2021, now Pat. No. 11,435,065, which is a continuation of application No. 16/910,520, filed on Jun. 24, 2020, now Pat. No. 10,969,086, which is a continuation of application No. 16/665,538, filed on Oct. 28, 2019, now Pat. No. 10,704,774, which is a continuation of application No. 16/019,060, filed on Jun. 26, 2018, now Pat. No. 10,458,631, which is a continuation of application No. 15/375,278, filed on Dec. 12, 2016, now Pat. No. 10,018,337.

(60) Provisional application No. 62/265,720, filed on Dec. 10, 2015.

(51) Int. Cl.

| | |
|---|---|
| ***F21S 6/00*** | (2006.01) |
| ***F21S 8/00*** | (2006.01) |
| ***F21S 9/02*** | (2006.01) |
| ***F21V 3/00*** | (2015.01) |
| ***F21V 17/02*** | (2006.01) |
| ***F21V 21/28*** | (2006.01) |
| ***F21V 21/30*** | (2006.01) |
| ***F21V 23/04*** | (2006.01) |
| ***F21V 29/76*** | (2015.01) |
| ***F21W 111/10*** | (2006.01) |
| ***F21W 131/10*** | (2006.01) |
| ***F21W 131/402*** | (2006.01) |
| ***F21Y 115/10*** | (2016.01) |

(52) U.S. Cl.

CPC *F21S 9/02* (2013.01); *F21V 3/00* (2013.01); *F21V 17/02* (2013.01); *F21V 23/0414* (2013.01); *F21V 29/76* (2015.01); *F21V 21/28* (2013.01); *F21V 21/30* (2013.01); *F21W 2111/10* (2013.01); *F21W 2131/10* (2013.01); *F21W 2131/402* (2013.01); *F21Y 2115/10* (2016.08)

(56) References Cited

U.S. PATENT DOCUMENTS

| | | | | |
|---|---|---|---|---|
| 6,422,709 | B1 | 7/2002 | Panagiotou | |
| D588,733 | S | 3/2009 | O'Hern | |
| D593,236 | S | 5/2009 | Ng et al. | |
| D612,084 | S | 3/2010 | Hillard | |
| D612,965 | S | 3/2010 | Extrand | |
| D621,536 | S | 8/2010 | Lee | |
| 7,988,344 | B2 * | 8/2011 | Ma | B62J 6/03 362/474 |
| D661,417 | S | 6/2012 | Kung | |
| 8,840,264 | B2 | 9/2014 | Molina et al. | |
| 8,911,116 | B2 | 12/2014 | Blincoe et al. | |
| 9,476,578 | B2 | 10/2016 | Mumma et al. | |
| 9,482,395 | B2 | 11/2016 | Ellingson et al. | |
| 9,845,940 | B2 | 12/2017 | Rugendyke et al. | |
| D822,246 | S | 7/2018 | Hou | |
| 10,018,337 | B2 | 7/2018 | Dorman | |
| 2002/0034073 | A1 | 3/2002 | Halasz | |
| 2006/0028812 | A1 | 2/2006 | Yuen | |
| 2006/0061991 | A1 | 3/2006 | Yeh | |
| 2006/0087833 | A1 * | 4/2006 | Simoni | F21V 21/30 362/103 |
| 2006/0146549 | A1 | 7/2006 | Yuen | |
| 2007/0014115 | A1 | 1/2007 | Katz et al. | |
| 2008/0225518 | A1 | 9/2008 | Devaney et al. | |
| 2008/0295371 | A1 | 12/2008 | Hsu | |
| 2010/0014289 | A1 | 1/2010 | Thomas et al. | |
| 2011/0103037 | A1 | 5/2011 | Liu et al. | |
| 2011/0235330 | A1 | 9/2011 | Pederson et al. | |
| 2011/0255274 | A1 | 10/2011 | Coleman et al. | |
| 2012/0020064 | A1 | 1/2012 | Pelletier et al. | |
| 2012/0033412 | A1 | 2/2012 | Molina et al. | |
| 2013/0077296 | A1 | 3/2013 | Goeckel et al. | |
| 2013/0258645 | A1 | 10/2013 | Weber et al. | |
| 2014/0043800 | A1 | 2/2014 | Weber et al. | |
| 2014/0268700 | A1 | 9/2014 | Mumma et al. | |
| 2015/0131276 | A1 | 5/2015 | Thompson et al. | |
| 2015/0167943 | A1 | 6/2015 | Rugendyke et al. | |
| 2016/0305637 | A1 | 10/2016 | Brunelli | |
| 2017/0138575 | A1 | 5/2017 | Harvey et al. | |

FOREIGN PATENT DOCUMENTS

| | | |
|---|---|---|
| EP | 2927557 | 10/2015 |
| EP | 3168523 | 5/2017 |
| WO | 2013030099 | 3/2013 |

OTHER PUBLICATIONS

European Patent Office Action for Application No. 16203513.3 dated Apr. 10, 2019 (5 pages).

* cited by examiner

FLOOD LIGHT

CROSS-REFERENCE TO RELATED APPLICATIONS

This application is a continuation of U.S. application Ser. No. 17/902,345, filed Sep. 2, 2022, now U.S. Pat. No. 11,754,265, which is a continuation of U.S. application Ser. No. 17/223,769, filed Apr. 6, 2021, now U.S. Pat. No. 11,435,065, which is a continuation of U.S. application Ser. No. 16/910,520, filed Jun. 24, 2020, now U.S. Pat. No. 10,969,086, which is a continuation of U.S. application Ser. No. 16/665,538, filed Oct. 28, 2019, now U.S. Pat. No. 10,704,774, which is a continuation of U.S. application Ser. No. 16/019,060, filed Jun. 26, 2018, now U.S. Pat. No. 10,458,631, which is a continuation of U.S. application Ser. No. 15/375,278, filed Dec. 12, 2016, now U.S. Pat. No. 10,018,337, which claims priority to U.S. Provisional Application No. 62/265,720, filed Dec. 10, 2015, of which the entire contents of all the listed applications are incorporated herein by reference.

FIELD OF THE INVENTION

The present invention relates to lights, and more particularly to floodlights.

BACKGROUND OF THE INVENTION

Flood lights and spot lights provide a focused or diffused light source in low light conditions. The lights may rest on a surface or be fixed in a position to direct light in various environments.

SUMMARY OF THE INVENTION

The present invention provides, in one aspect, a light comprising a housing including front face, a first face, a second face, and a first surface arranged between the first face and the front face. The light also includes a lens disposed in the front face, a light source covered by the lens, and a power source configured to provide power to the light source. The first face is angled at a first oblique angle with respect to the front face, the second face is angled at a second oblique angle with respect to the front face, and the first surface is angled at a third oblique angle with respect to the front face. The first face, the second face, and the first surface each define a surface configured to support the light.

The present invention provides, in another aspect, a light comprising a light head including a front face and a first surface. The light head is movable between a first position and a second position. The first surface is angled at a first oblique angle with respect to the front face. The light further comprises a housing including a top face, a bottom face, a first side face, a second side face and a second surface arranged adjacent the bottom face. The light head is movably coupled to the housing. The first surface and the second surface are coplanar when the light head is in the first position. The first surface and the second surface are not coplanar when the light head is in the second position. The light further comprises a plurality of LEDs arranged to emit light from the front face in a direction substantially normal to the front face.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
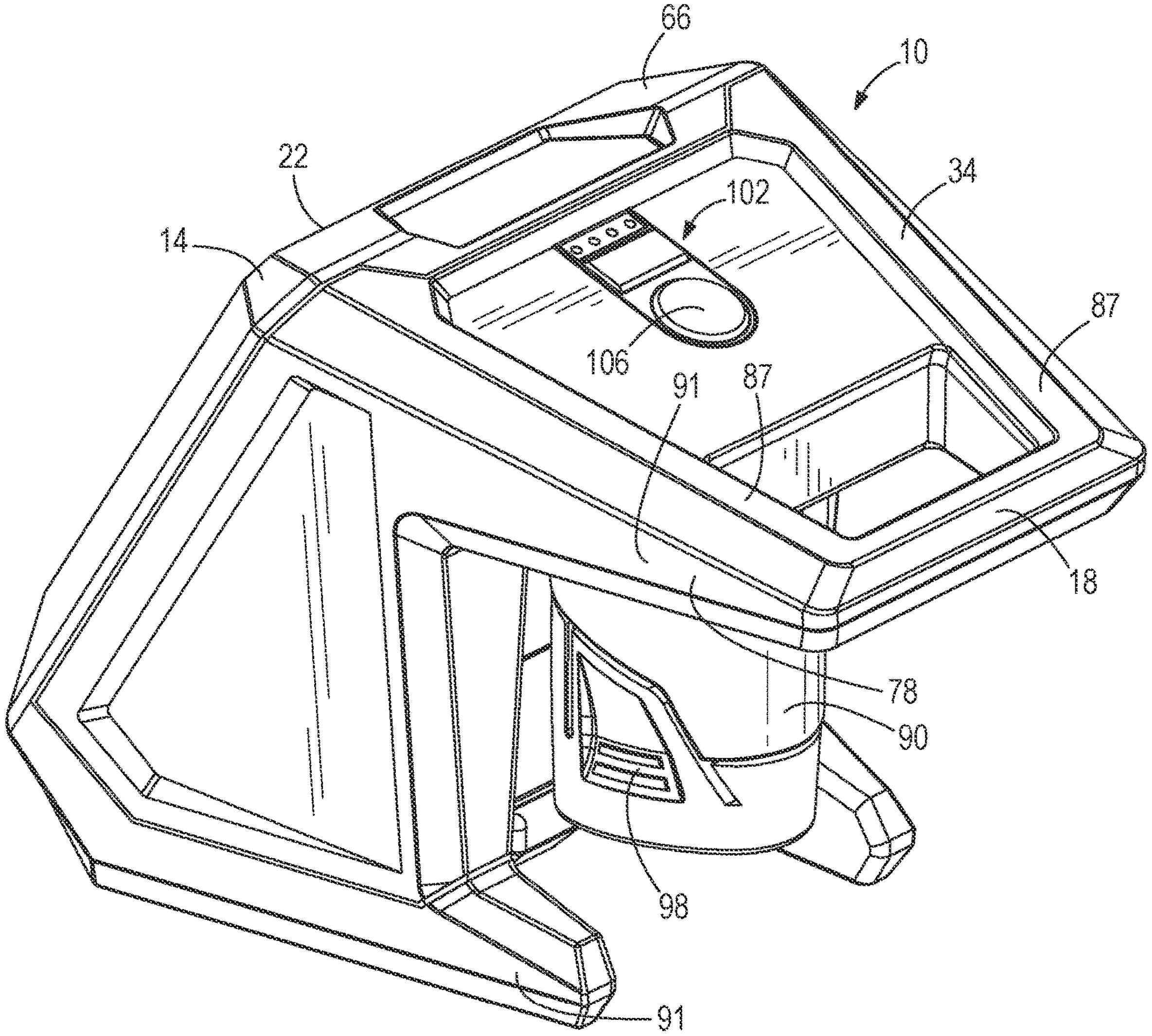
FIG. 1 is a rear perspective view of a light in accordance with an embodiment of the invention.
Figure 2:
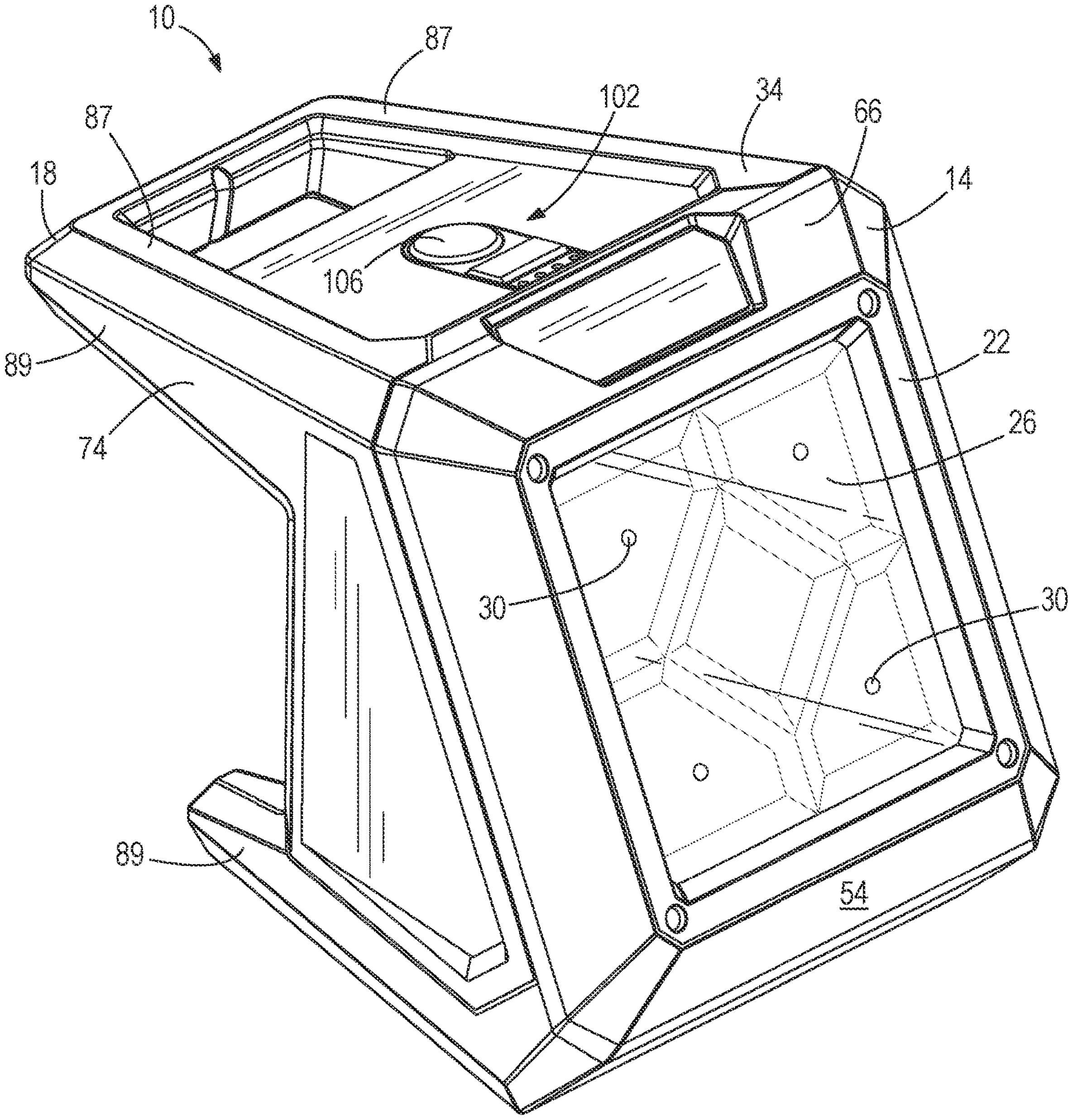
FIG. 2 is a front perspective view of the light of FIG. 1.

FIGS. 1-6 illustrate a light 10 that can be used as a flood light or a spot light as may be desired by the user. With reference to FIGS. 1 and 2, the light includes a housing 14 that is defined by a plurality of angled faces and surfaces. The housing 14 defines a handle 18 for use in carrying the light or hanging the light 10. A front face 22 of the housing supports a lens or diffuser 26 that covers a light source 30, in this case a plurality of LEDs, through which light is emitted.

Figure 3:
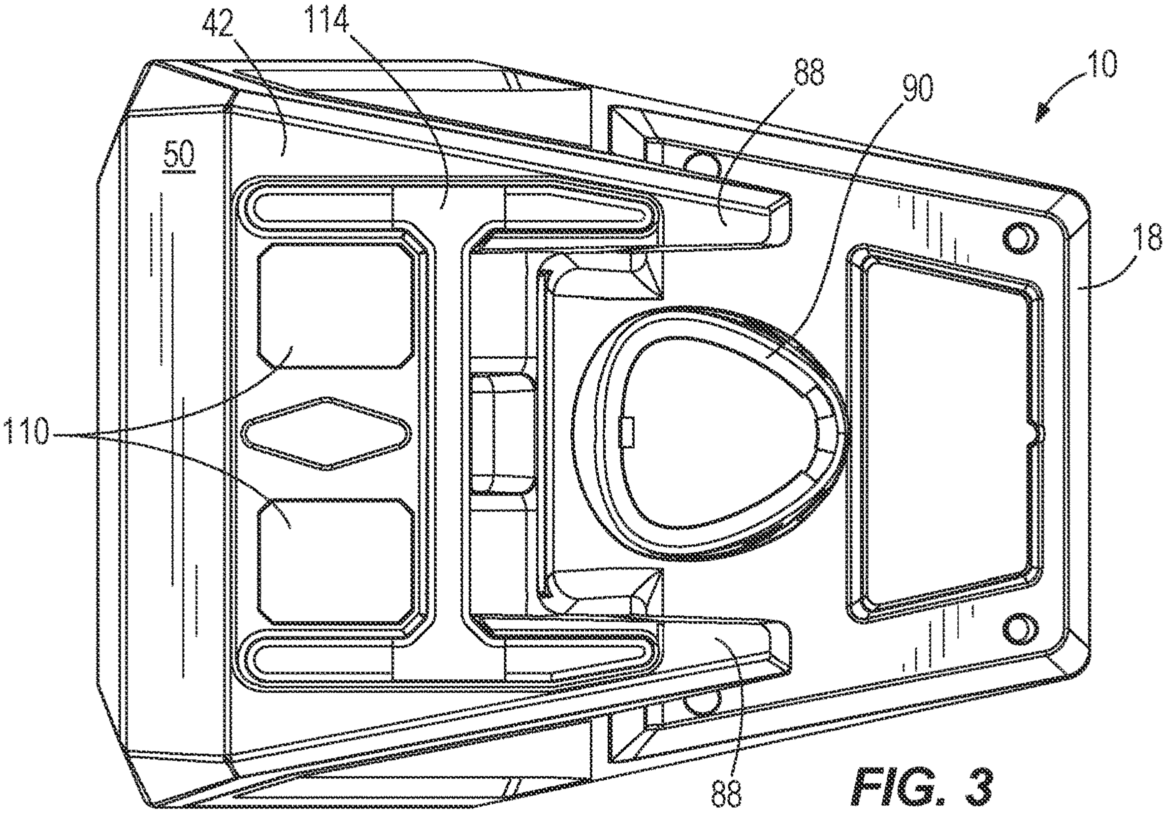
FIG. 3 is a bottom plan view of the light of FIG. 1.
Figure 4:
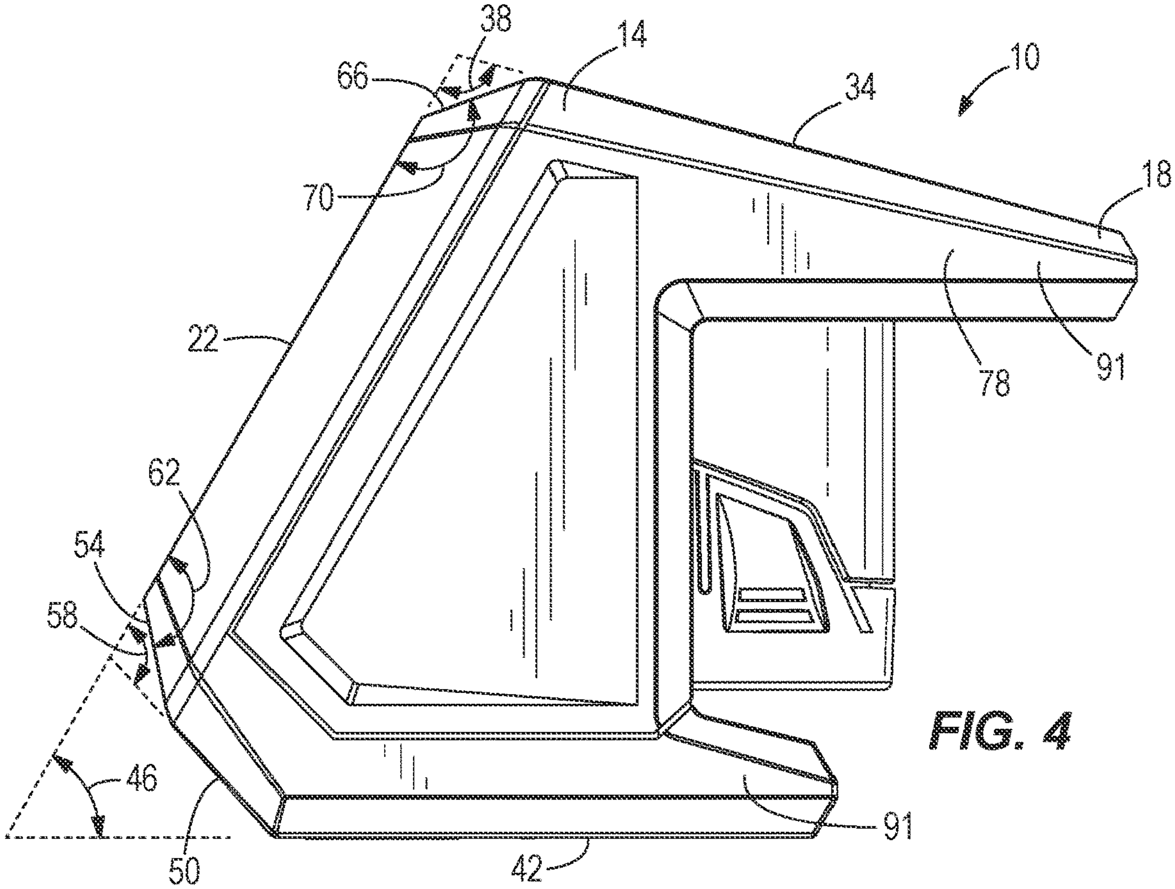
FIG. 4 is a side view of the light of FIG. 1.
Figure 5:
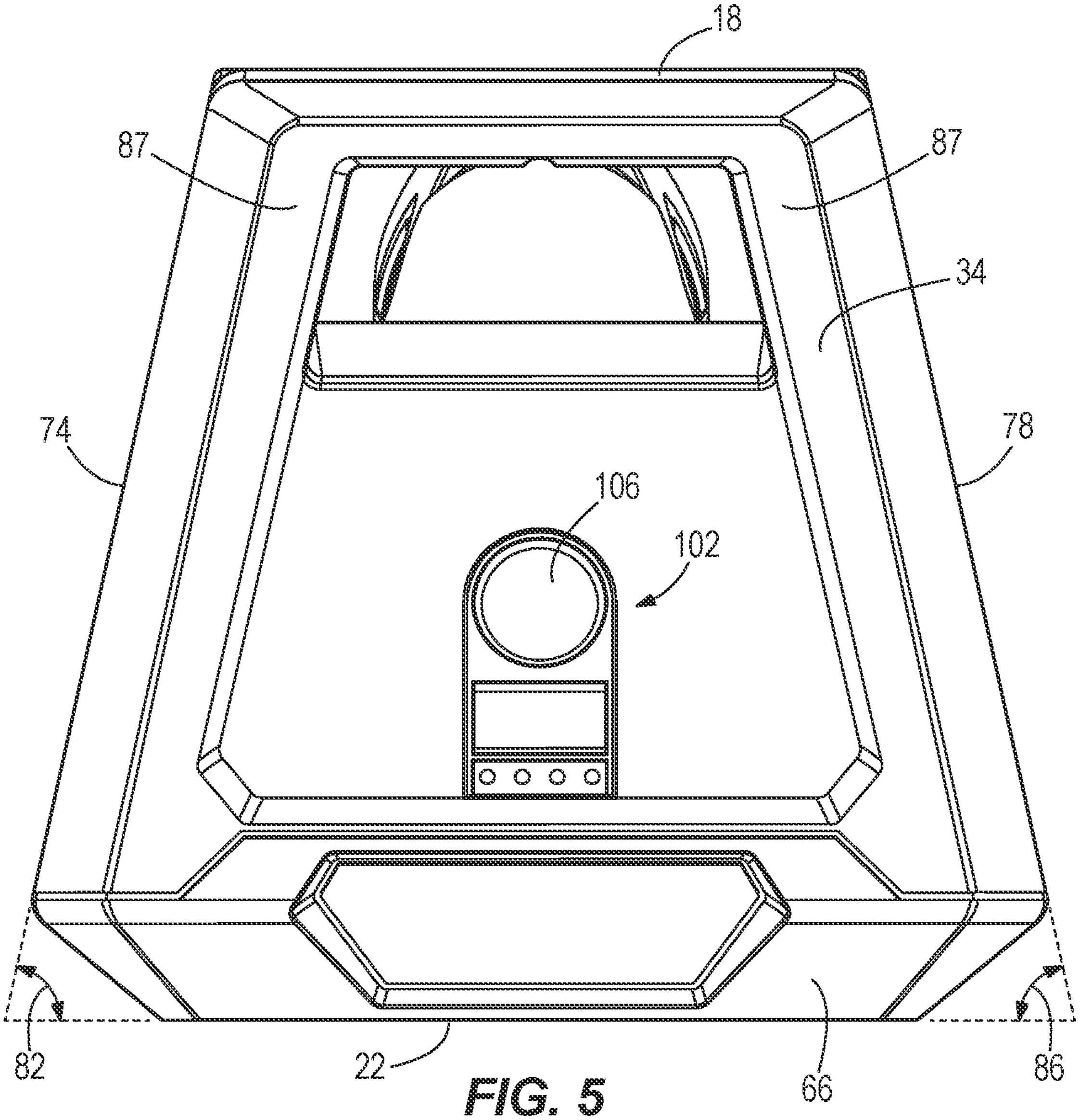
FIG. 5 is a top view of the light of FIG. 1.

With reference to FIG. 4, the housing includes a top face 34 that is angled at a first With reference to FIG. 4, the housing includes a top face 34 that is angled at a first angle 38 between about 70 and 120 degrees with respect to the front face 22. A bottom face 42 is angled at a second oblique angle 46 with respect to the front face 22 and is not parallel to the top surface 34. First and second surfaces 50, 54 are arranged between the bottom face 42 and the front face 22 at, respective, third and fourth angles 58, 62 between about 70 and 120 degrees with regard to the front face 22. A third surface 66 is arranged between the top face 34 and the front face 22 at a fifth oblique angle 70 with respect to the front face 22. As illustrated in FIG. 5, two side faces 74, 78 are arranged at sixth and seventh oblique angles 82, 86 with respect to the front face 22, to provide additional flexibility and options for positioning and directing the emitted light as desired. Thus, seven surfaces or faces 34, 42, 50, 54, 66, 74, 78 are provided that can support the light while directing the front face 22 and light in different directions. The top face 34 includes two legs 87 (FIGS. 1, 2 and 5) spaced apart from one another and extending away from the third surface 66. The top face 34 also includes the handle 18, which extends between the two legs 87 of the top face 34. The bottom face 42 includes two legs 88 (FIGS. 3 and 6) spaced apart from one another and extending away from the first surface 50. The side face 74 includes two legs 89 (FIGS. 2 and 6) spaced from one another and extending away from the front face 22. The side face 78 includes two legs 91 (FIGS. 1 and 4) spaced from one another and extending away from the front face 22.

Figure 6:
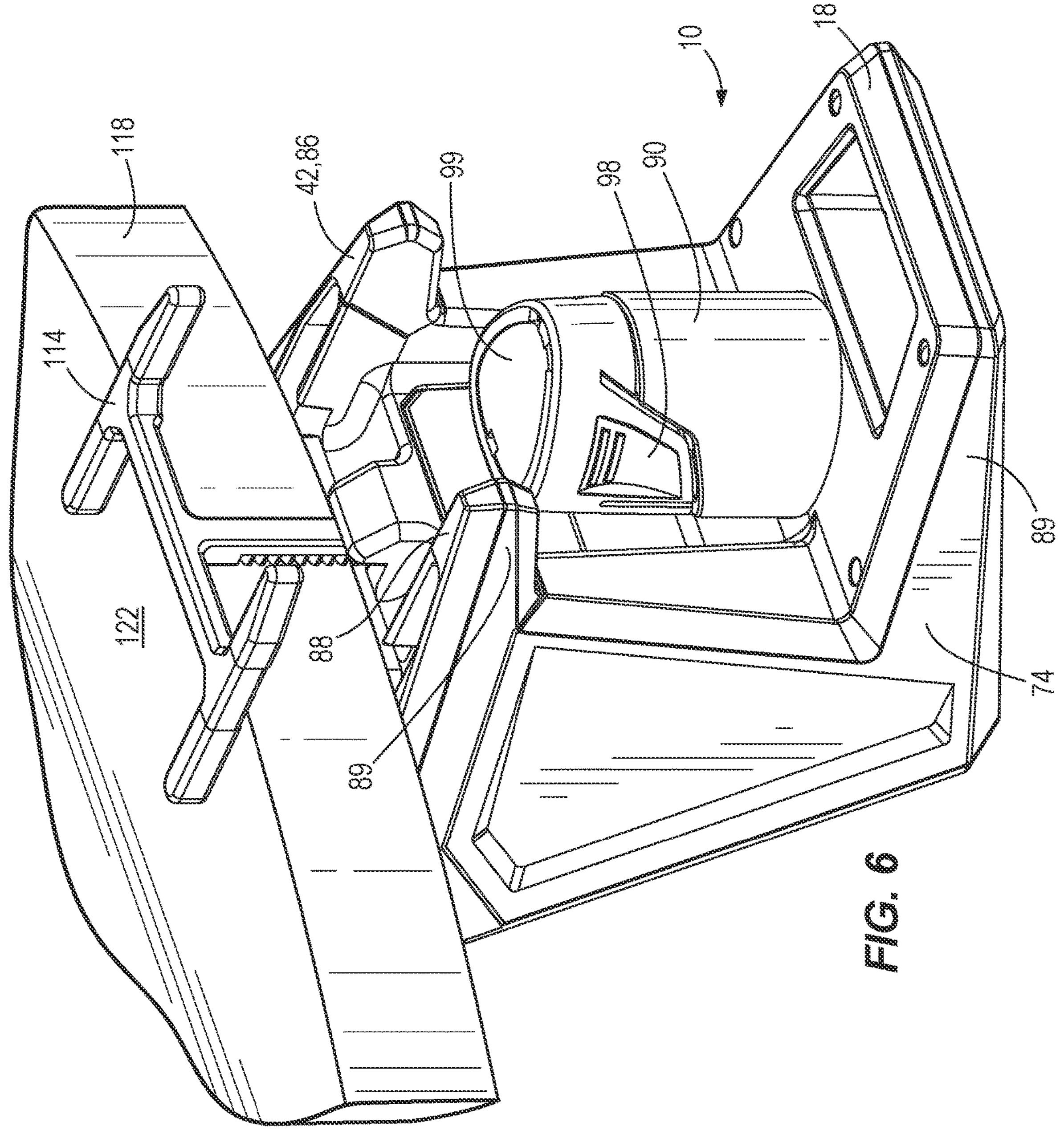
FIG. 6 is a view of the light of FIG. 1 clamped onto a table.

With reference to FIGS. 1, 3 and 6, the housing 14 defines a battery pack receiving port 90 that is arranged to receive a battery pack 94. In preferred constructions, the battery pack 94 is a power tool pack capable of delivering electrical power at 12 volts or more. The battery pack 94 is easily insertable and removable from the receiving port 90. The receiving port 90 may also include a locking mechanism 98 that engages the battery pack 94 when it is inserted to inhibit the accidental removal of the battery pack 94.

The housing includes a set of controls 102 that include a button 106 to allow the user to turn the light on and off. In some constructions, the button 106, or another control member of the controls allows the user to cycle through various operating modes for the light. For example, the button could allow a user to select low, medium, or high settings. Alternatively, or in addition to low, medium, and high, the button 106 could allow a user to cycle between flood light, spot light, or a combination thereof. In some constructions, the set of controls 102 may include indicator lights to indicate the operating mode, the low, medium and high settings, the remaining battery life, or any other indicators relevant to operation of the light.

With reference to FIG. 3, the light 10 includes magnets 110 that are positioned to allow for the attachment of the housing 14 and the light to a magnetic surface. In the construction illustrated in FIG. 3, two magnets 110 are provided in the bottom face 42 of the housing 14. However, other constructions may include more magnets 110 or fewer magnets or may include magnets in other faces or surfaces of the housing 14, such as the top face 34, bottom face 42, and side faces 74, 78. In other constructions, the light 10 does not include any magnets.

With reference to FIGS. 3 and 6, a clamp member 114 is movably coupled to the housing and includes two legs that extend partially around the magnets 110. In FIGS. 3 and 6, the clamp member 114 is H-shaped and is movable between a retracted position illustrated in FIG. 3 and an extended position illustrated in FIG. 6. In a preferred construction, the clamp member 114 is biased toward the retracted position to facilitate clamping or engaging a construction member 118 such as a table, a wall, a stud, a beam, a pipe, or the like. The H-shape of the clamp member 114 allows the clamp member 114 to engage the construction member 118 in several different orientations. In other constructions, the clamp member 114 may be a variety of shapes to accommodate clamping arrangements on a variety of construction members 118. The retraction of the clamp member allows the light to rest on surfaces, instead of clamping the light 10 to the construction member 118.

Figure 7:
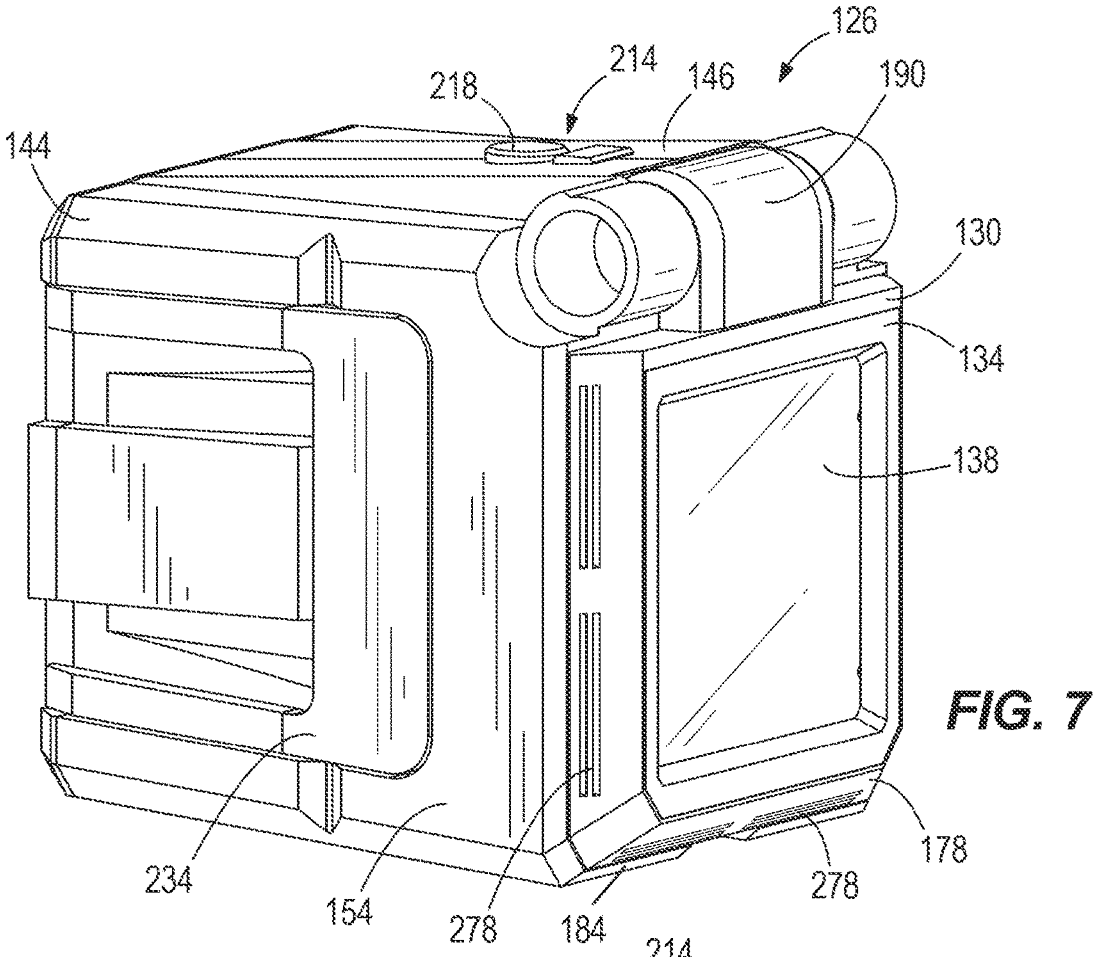
FIG. 7 is a front perspective view of a light in accordance with an embodiment of the invention.
Figure 8:
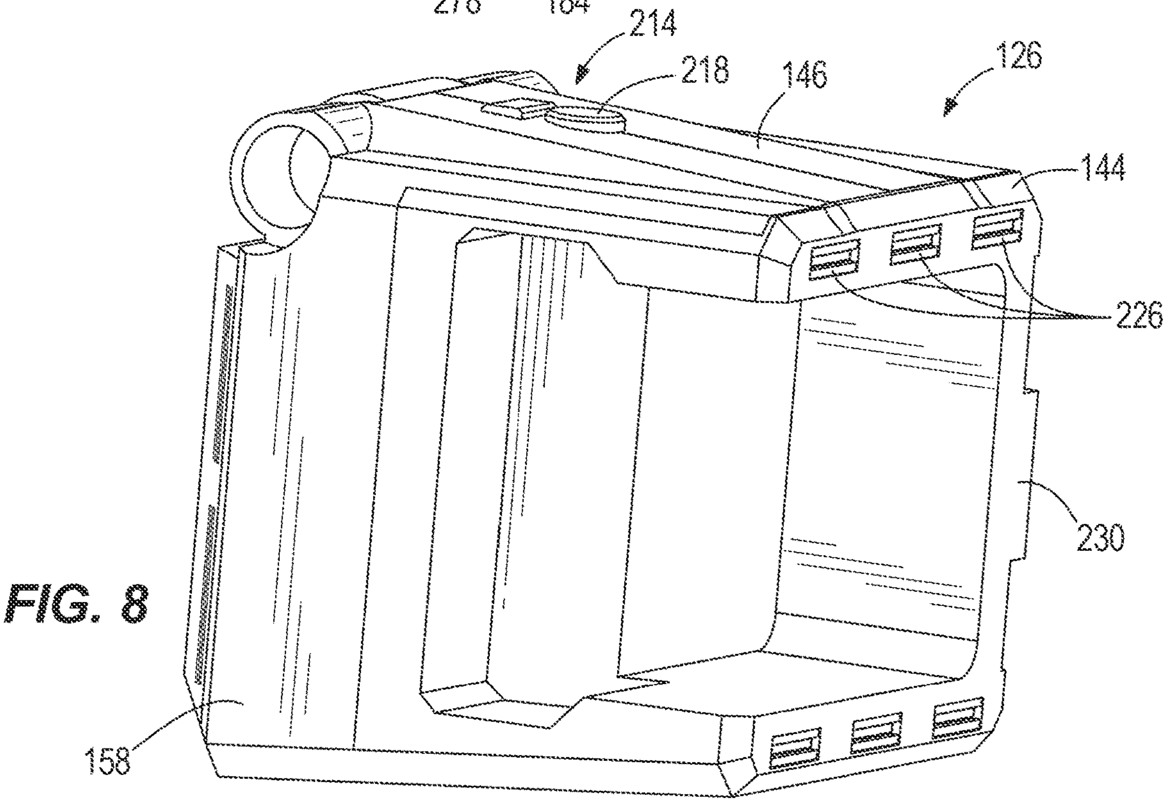
FIG. 8 is a rear perspective view of the light of FIG. 7.
Figure 9:
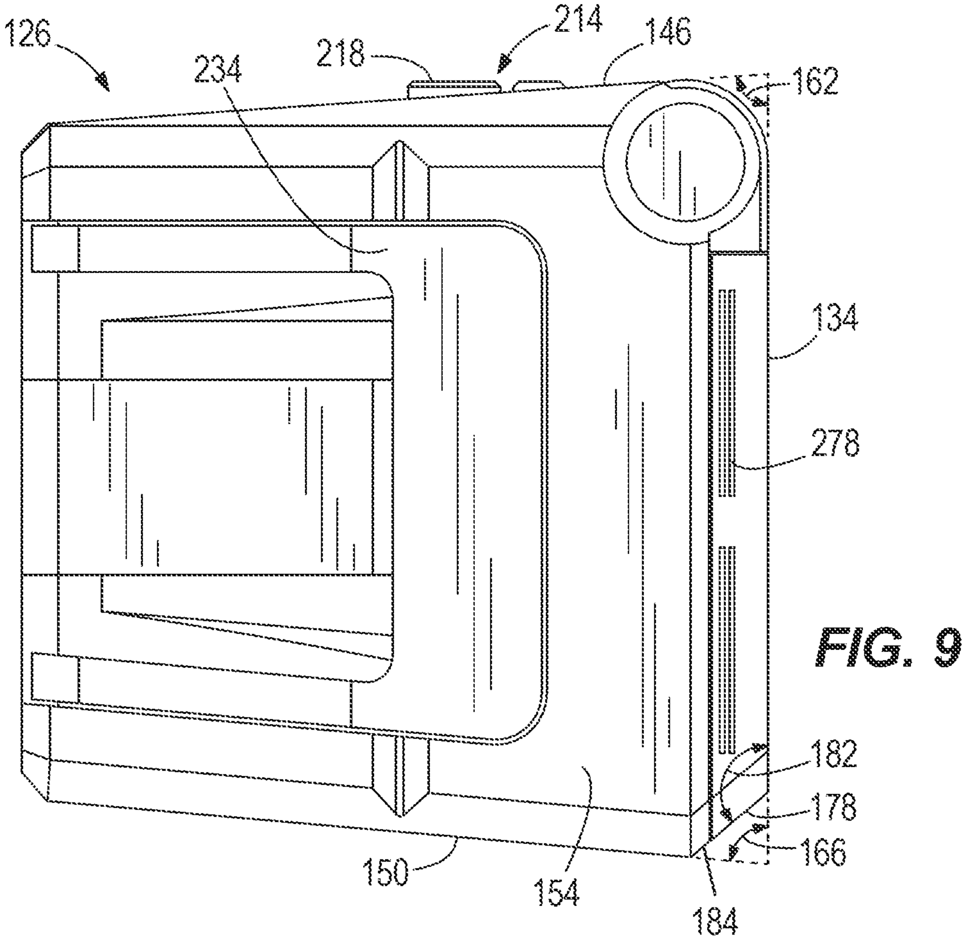
FIG. 9 is a side view of the light of FIG. 7.
Figure 10:
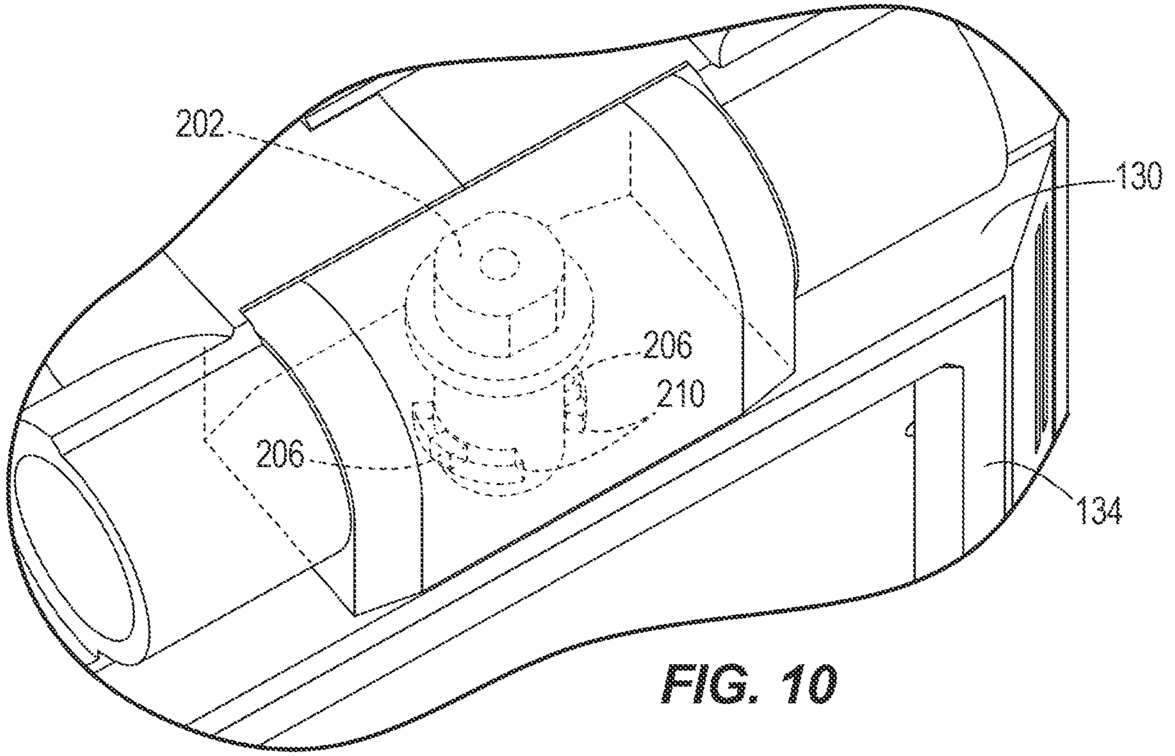
FIG. 10 is a perspective view of the light of FIG. 7 showing a swivel joint in dashed lines within a pivot joint.

In another embodiment of the invention shown in FIGS. 7-14, a light 126 includes a head 130 that includes a front face 134, a lens or diffuser 138, and a plurality of LEDs (not shown). As in the first embodiment, a housing 144 also includes a top face 146, a bottom face 150, and first and second side faces 154, 158 respectively arranged at first, second, third, and fourth oblique angles 162, 166, 170, 174 with respect to the front face 134, and capable of supporting the light 126 while directing the front face 134 and light in different directions. With reference to FIGS. 7 and 9, the head 130 also includes a first surface 178 that is arranged between the front face 134 and the bottom face 150 at a fifth oblique angle 182 with respect to the front face 134. The housing 144 also includes a second surface 184 arranged adjacent to the bottom face 150. Also, like the construction of FIGS. 1-6, the light includes a battery receptacle sized to receive a battery pack and preferably a power tool battery pack (not shown).

Figure 11:
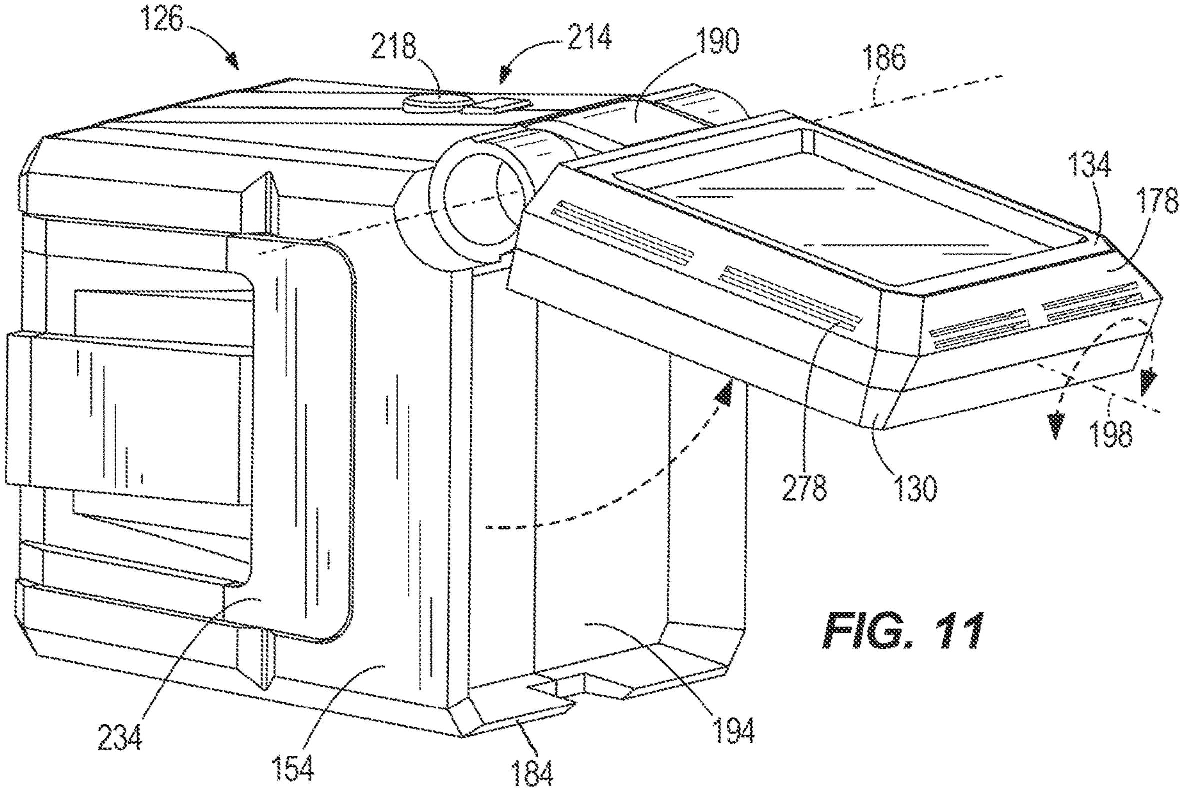
FIG. 11 is a top view of the light of FIG. 7.

With reference to FIG. 11, the head 130 is pivotable about a first axis 186 defined by a pivot joint 190, such as a hinge joint, arranged between the top face 146 and the head 130. In the head's first or home position, the head 130 is positioned within a pocket 194 defined between the top face 146, the bottom face 150, and the first and second side faces 154, 158. As shown in FIGS. 7 and 9, when the head 130 is in the first position, the first surface 178 and second surface 184 are coplanar and oblique with respect to the front face 134, thereby providing another surface for an operator to rest the light 126.

With continued reference to FIG. 11, when the head 130 is pivoted outward to an extended position, the head 130 is then rotatable about a second axis 198 that is normal to the first axis 186, as indicated by rotation arrows. The head 130 rotates via a swivel joint 202 that is rotatably coupled to the pivot joint 190. The swivel joint 202 includes at least one swivel stop 206 at the base of the swivel joint 202 on the head 130. The swivel stop 206 is abuttable against a pivot stop 210 within the pivot joint 190. The head's rotation is limited to a predetermined angle defined by the relative placement of the swivel stop 202 and pivot stop 210. The head's ability to pivot and rotate with respect to the housing 144 provides even more flexibility and options for positioning the light 126 and directing the emitted light as desired.

The housing 144 includes controls 214, including a button 218 on the top face 146 that allows the user to turn the light 126 on and off. Wires may be threaded through the pivot joint 190 and swivel joint 202 to couple a battery (not shown) to a circuit board 222 and the LEDs in the head 130. The rotation of the head 130 is limited to protect the wires that connect the power supply to the LEDs. However, other constructions may include an electrical connection such as slip rings that allow for unlimited rotation about the second axis 198.

Figure 14:
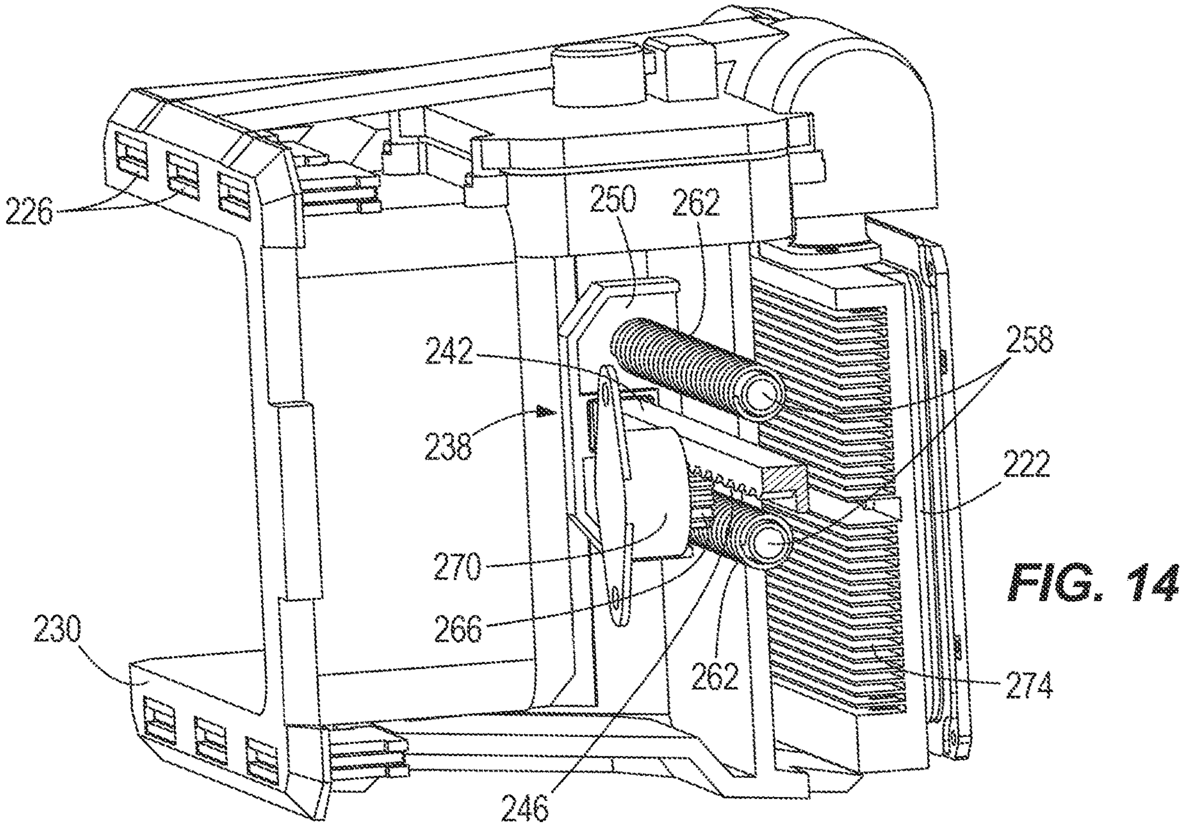
FIG. 14 is a side perspective view of the light of FIG. 7 with portions of the housing removed to show the circuit board, fins, and clamp mechanism.

With reference to FIGS. 8 and 14, a plurality of magnets 226 is located on a rear face 230 of the housing 144, opposite the head 130. However, as in the first embodiment, other constructions may include more magnets 226 or fewer magnets or may include magnets in other faces or surfaces of the housing, such as the top face 146, bottom face 150, and first and second side faces 154, 158. In other constructions, the light 126 does not include any magnets.

Figure 13:
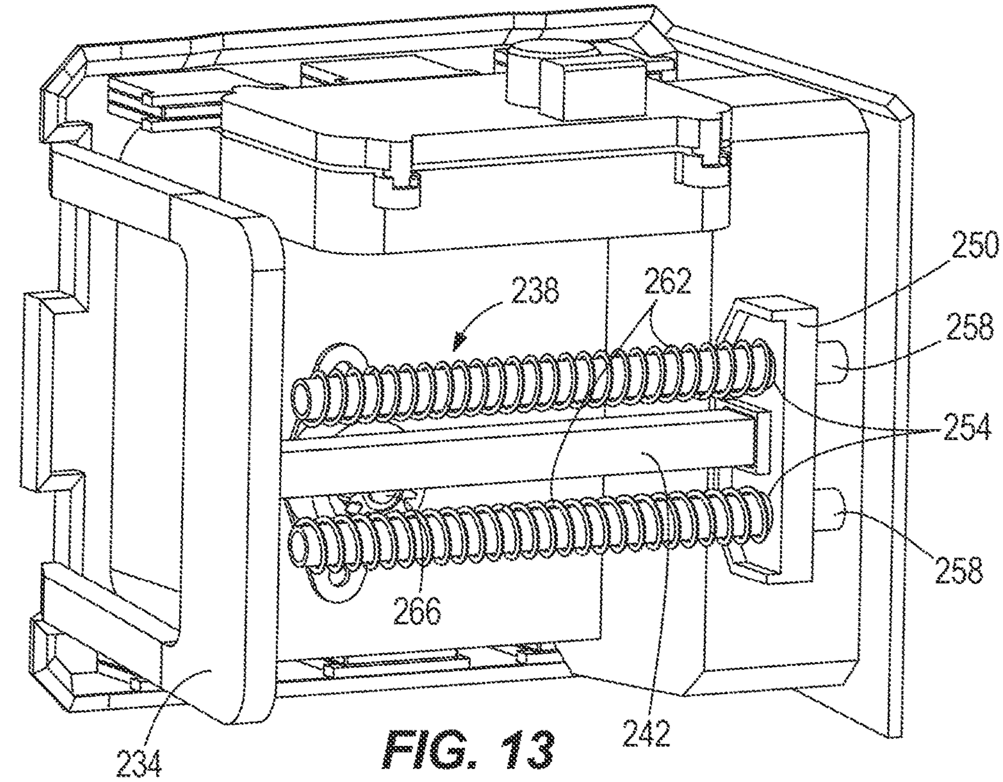
FIG. 13 is a front perspective of the light of FIG. 7 with portions of the housing removed to show the clamp mechanism.

With reference to FIGS. 7, 9, 11 and 13, a clamp member 234 is located on the first side face 154 and is part of a clamping mechanism 238. The clamp member of FIGS. 7, 9, 11, and 13 is C-shaped rather than the H-shaped clamping mechanism 114. In addition, the clamping mechanism of FIGS. 7, 9, 11 and 13 extends out of a side surface of the light in a direction substantially normal to the light emission axis. FIGS. 13 and 14 better illustrate the internal structure of the light 126 and the clamping mechanism 238. As illustrated, the clamp member 234 is coupled to a guide rod 242 that moves into and out of the housing 144 as the clamp member 234 is moved between the retracted and the extended position. The guide rod 242 includes a geared surface 246 along its long axis and a first end that is fixedly attached to the clamp member 234 and a second opposite end fixedly attached to a guide base 250.

The guide base 250 includes a pair of apertures 254 each sized to receive a guide pin 258 while allowing free movement of the guide base 250 with respect to the guide pins 258. A compression spring 262 is positioned around each guide pin 258 with a first end in engagement with the guide base 250 and a second end abutting an inner surface of the housing 144. The compression springs 262 apply a biasing force against the guide base 250 to bias the guide base 250 and the clamp member 234 towards the retracted position. The compression springs 262 are selected to assure that the clamp member 234 provides sufficient clamping force to hold the light 126 in the desired position when clamped to an object or construction member 118. In other constructions, a single biasing member 262 or other biasing arrangement may be employed.

With reference to FIGS. 13 and 14, the clamp mechanism 238 also includes a pinion gear 266 and a damping member 270. The damping member 270 can be any suitable damping member with the illustrated construction including a viscous damper. The damping member 270 is fixedly attached to the housing 144 and therefore does not move with respect to the housing 144. The pinion gear 266 is coupled to an input shaft (not shown) of the viscous damper 270 such that rotation of the pinion gear 266 produces a corresponding rotation of the viscous damper 270. Thus, in the arrangement illustrated in FIGS. 12 and 13 movement of the clamp member 234 produces a corresponding movement of the guide rod 242 which in turn produces rotation of the pinion 266 and the viscous damper 270. The viscous damper 270 produces a resistance to movement that is proportional to the speed of rotation. Thus, the viscous damper 270 provides a minimum level of resistance during slow movement of the clamp member 234 and produces a greater resistance force (counter to the movement) if the clamp member 234 moves faster.

In operation, when the clamp member 234 is moving from the extended position to the retracted position via the biasing effect of the compression springs 262, the geared surface 246 of the guide rod 242 cause the pinion gear 266 to rotate. The viscous damper 270 resists the rotation of the gear 266, thereby slowing the movement of the guide rod 242 to reduce the likelihood of the clamp member 234 suddenly snapping back to the retracted position. In other constructions, damping members other than viscous dampers are employed. For example, eddy current devices or centrifugal force devices could be employed as damping members.

With reference to FIG. 14, the circuit board 222 is positioned adjacent the front face 134 to support the LEDs. A plurality of fins 274 is coupled to the circuit board 222 to provide cooling for the LEDs 142. In preferred constructions, the fins 274 are formed from aluminum or another good heat conducting material and are positioned adjacent air passages formed in the housing 144. The passages allow for air flow through the fins 274 to reduce the temperature of the fins and the LEDs. With reference to FIGS. 7, 9 and 11, the head 130 also includes vents 278 to allow hot air to escape. In other constructions, the head 130 does not include any vents.

In operation an operator orients the light 10, 126 by placing one of the bottom face 42, 150, top face 34, 146, side faces 74, 78, 154, 158, first surface 50, 178, second surface 54, or third surface 66 on the surface 122 of the construction member 118. The first 38, 162, second 46, 166, third 58, 170, fourth 62, 174, fifth 70, 182, sixth 82, and seventh 86 oblique angles give the operator a great degree of flexibility when deciding how to orient the front face 22, 134, and thus the light source 30, 142, with respect to the surface 122 of the construction member 118. If the operator does not like the orientation of the light 10, 126, the operator can simply switch which face or surface of the housing 14, 144 rests on the surface, thereby orienting the light 10, 126 at a new angle with respect to the surface 122 of the construction member 118.

Alternatively an operator may clamp the light 10, 126 to the construction member 118 by drawing the clamp member 114, 234 out of the housing 14, 144 to the extended position. As the operator draws the clamp member 114, 234 outwardly from the housing 14, 144, the guide rod 242 and the guide base 250 move within the housing 14, 144 in the same direction, which causes the compression springs 262 to compress. Once in the fully extended position, the clamp member 114, 234 may be clamped onto a construction member 118 and held in position via the biasing force of the compression spring 262 against the guide base 250, which in turn biases the clamp member 114, 234 against the surface 122 of the construction member 118.

To release the clamping mechanism 238 from its clamped arrangement, an operator pulls the clamp member 114, 234 into the fully extended position and slides the clamp member 114, 234 off the construction member 118. Alternatively, the user may simply slide the light off of the construction member, thereby releasing the clamp mechanism. The clamp member 114, 234 will now be biased, via the biasing force produced by the compression springs against the guide base 250, back into its retracted position. As the clamp member 114, 234 slides back into the housing 14, 144, the geared surface 246 engages with the pinion gear 266, causing the pinion gear 266 to rotate. The speed at which the guide rod 242, and thus the clamp member 114, 234, slides back into the retracted position is limited by the viscous damper 270, which provides resistance to movement that is proportional to the speed of the gear's rotation.

Whether or not the light 126 is clamped to a construction member 118 or resting on the surface 122, the head 130 may be pivoted about the first axis 186 from the housing via the pivot joint 190 to provide further flexibility in orienting the light 126, as shown in FIG. 11. Once pivoted into a pivoted position, the head 130 may then be rotated via the swivel joint 202 about the second axis 198 to provide the operator with even greater latitude in orienting the light 126. The rotation of the head 130 via the swivel joint 202 may be limited by the swivel stops' 206 abutment against the pivot stop 210 or the swivel joint 202 may comprise a slip ring to provide the head with unlimited rotation about the second axis 198.

Figure 12:
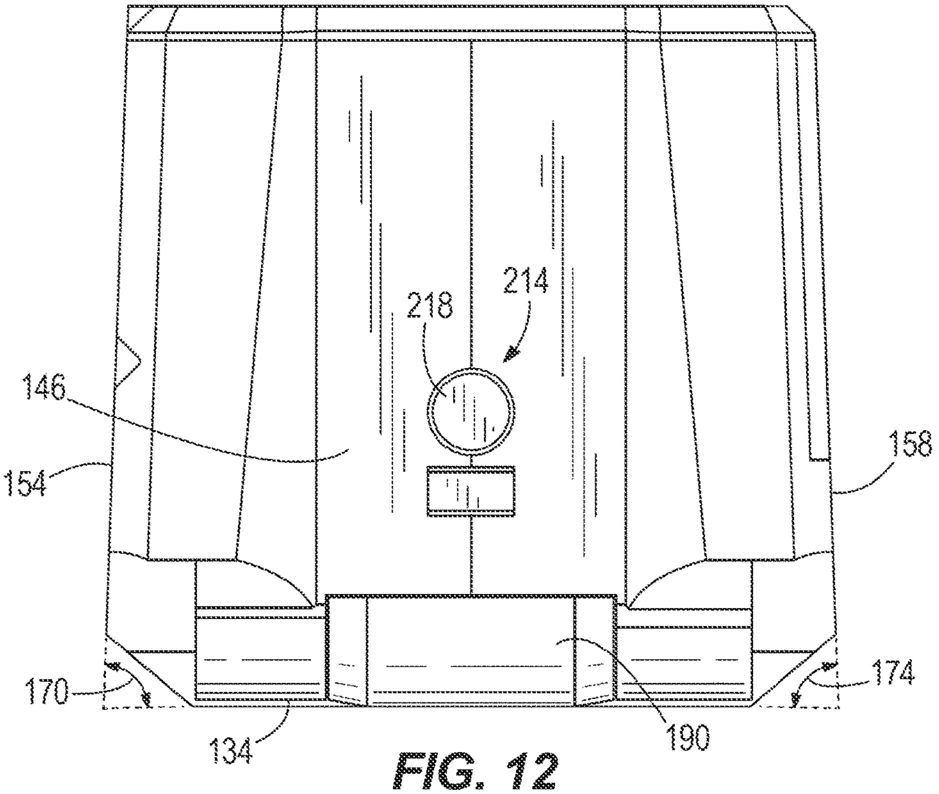
FIG. 12 is a front perspective view of the light of FIG. 7 with the front face pivoted outwardly from the housing.

While the angles described herein have been described as oblique, it is also possible that the angles could be 90 degrees, with particular reference to first angle and second angles 162, 166 shown in FIG. 9 and third and fourth angles 170, 174 shown in FIG. 12. Furthermore, though some features of the invention described above may only be shown or described in one embodiment, one of skill in the art will appreciate that all of these features are equally applicable and includable with any and all embodiments described herein.

Various features of the invention are set forth in the following claims.

What is claimed is:

1. A light comprising:

a housing including a top face, a bottom face, a first side face, a second side face, and a surface arranged adjacent to the bottom face, wherein the top face, the bottom face, the first side face, the second side face, and the surface are each configured to support the light;

a head pivotally coupled to the housing, the head including a lens and a plurality of LEDs configured to emit light through the lens; and a power source configured to provide power to the plurality of LEDs, wherein the head is positioned between the top face, the bottom face, and the first and second side faces in a first position of the head, and wherein the surface is obliquely oriented relative to the lens when the head is in the first position.

2. The light of claim 1, wherein the head is pivotable about an axis relative to the housing to adjust an orientation of the head relative to the housing.

3. The light of claim 1, further comprising a plurality of fins disposed on the head and configured to provide cooling for the plurality of LEDs.

4. The light of claim 3, wherein the plurality of fins is formed from aluminum.

5. The light of claim 1, wherein the power source is a battery pack.

6. The light of claim 1, further comprising a circuit board within the head, wherein the circuit board is configured to support the plurality of LEDs.

7. The light of claim 1, further comprising a clamp member coupled to the first side face.

8. A light comprising:

a housing including a top face, a bottom face, a first side face, a second side face, and a surface arranged adjacent to the bottom face, wherein the top face, the bottom face, the first side face, the second side face, and the surface are each configured to support the light;

a head pivotally coupled to the housing, the head including a lens and a plurality of LEDs configured to emit light through the lens along a light emission axis;

a power source configured to provide power to the plurality of LEDs; and a clamp member coupled to the first side face, wherein the clamp member extends from the first side face in a direction substantially normal to the light emission axis.

9. The light of claim 8, wherein the clamp member is C-shaped.

10. The light of claim 8, wherein the clamp member is movably coupled to the housing.

11. The light of claim 8, wherein the clamp member is movable relative to the housing between a retracted position and an extended position.

12. The light of claim 8, wherein the surface is oriented at an oblique angle with respect to the bottom face.

13. The light of claim 8, wherein the head is pivotable about an axis relative to the housing to adjust an orientation of the head relative to the housing.

14. A light comprising:

a housing including a top face, a bottom face, a first side face, a second side face, and a surface arranged adjacent to the bottom face, wherein the top face, the bottom face, the first side face, the second side face, and the surface are each configured to support the light;

a head pivotally coupled to the housing, the head including a lens and a plurality of LEDs configured to emit light through the lens;

a power source configured to provide power to the plurality of LEDs;

a circuit board within the head, wherein the circuit board is configured to support the plurality of LEDs; and a plurality of fins coupled to the circuit board and configured to provide cooling for the plurality of LEDs.

15. The light of claim 14, wherein the plurality of fins is formed from aluminum.

16. The light of claim 14, wherein the plurality of fins is disposed on the head.

17. The light of claim 14, wherein the power source is a battery pack.

18. The light of claim 14, wherein the head is positioned between the top face, the bottom face, and the first and second side faces in a first position of the head.

19. The light of claim 18, wherein the head is pivotable about an axis relative to the housing to adjust an orientation of the head relative to the housing.

20. The light of claim 14, further comprising a clamp member coupled to the first side face.

* * * * *